(12) United States Patent
Sung et al.

(10) Patent No.: US 7,789,951 B2
(45) Date of Patent: Sep. 7, 2010

(54) METHOD AND SYSTEM FOR MOVING AIR PURIFIER

(75) Inventors: Young-hun Sung, Suwon-si (KR); Soon-joo Kwon, Seoul (KR); Jay-woo Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1083 days.

(21) Appl. No.: 11/292,285

(22) Filed: Dec. 2, 2005

(65) Prior Publication Data

US 2006/0137521 A1    Jun. 29, 2006

(30) Foreign Application Priority Data

Dec. 3, 2004    (KR) .................. 10-2004-0101243

(51) Int. Cl.
*B01D 46/46* (2006.01)
(52) U.S. Cl. .............. 96/397; 96/399; 96/417; 96/423; 318/580; 318/568.12; 55/356; 55/385.1; 55/DIG. 3
(58) Field of Classification Search ........ 95/1, 95/8, 11, 12, 25, 26; 96/417, 423, 397, 399, 96/400, 424; 55/DIG. 34, 354, DIG. 3, 385.1; 318/580, 568.12
See application file for complete search history.

(56) References Cited

U.S. PATENT DOCUMENTS

| | | | | |
|---|---|---|---|---|
| 4,726,824 A | * | 2/1988 | Staten | ............ 96/417 |
| 4,790,862 A | * | 12/1988 | Naruo et al. | ............ 96/397 |
| 6,447,731 B1 | * | 9/2002 | Sun et al. | ............ 422/121 |
| 7,031,134 B2 | * | 4/2006 | Izumi et al. | ............ 361/231 |
| 7,108,731 B2 | * | 9/2006 | Park et al. | ............ 55/356 |
| 7,120,006 B2 | * | 10/2006 | Sekoguchi et al. | ............ 361/230 |
| 7,288,912 B2 | * | 10/2007 | Landry et al. | ............ 318/580 |
| 2005/0257540 A1 | * | 11/2005 | Choi et al. | ............ 62/180 |

FOREIGN PATENT DOCUMENTS

| | | | |
|---|---|---|---|
| JP | 2002-172158 A | * | 6/2002 |
| JP | 2002-647652 | * | 6/2002 |
| JP | 2003-123217 | | 4/2003 |
| JP | 2004-325020 | | 11/2004 |

OTHER PUBLICATIONS

Notice of Examination Report issued on Jun. 30, 2006 by the Korean Intellectual Property Office in the corresponding Korean priority patent Application No. 10-2004-0101243.
Notice of Allowance dated Jun. 19, 2007 issued in the corresponding Korean Patent Application No. 10-2006-0119980 (4 pages).

* cited by examiner

*Primary Examiner*—Duane Smith
*Assistant Examiner*—Ives Wu
(74) *Attorney, Agent, or Firm*—Staas & Halsey LLP

(57) ABSTRACT

A method and system for purifying air while moving. The system for purifying air includes an air purification unit inhaling and purifying the air, a moving unit moving the system, and an object sensing unit sensing a wall existing at a side of the system in a direction in which the moving unit moves, wherein the moving unit moves while keeping a distance within a predetermined range from the wall sensed by the object sensing unit.

11 Claims, 11 Drawing Sheets

METHOD AND SYSTEM FOR MOVING AIR PURIFIER

CROSS-REFERENCE TO RELATED APPLICATIONS

This application claims priority from Korean Patent Application No. 10-2004-0101243 filed on Dec. 3, 2004 in the Korean Intellectual Property Office, the disclosure of which is incorporated herein by reference in its entirety.

BACKGROUND OF THE INVENTION

1. Field of the Invention

The present invention relates to a method and system for purifying air while moving.

2. Description of the Related Art

Air is closely connected to the environment in which humans live. Air influences the health of people every moment through inhalation and skin contact. For this reason, recently, air purification is attracting a lot of interest. Since the air cannot be seen, it is necessary to detect the degree of contamination in the air.

A conventional air purification system includes an air inhalation unit inhaling the air, a filter unit purifying the inhaled air, and an outlet unit discharging the purified air. Such a conventional air purification system can inhale the air only within a limited range.

A conventional air purification system provided in a home or office is stationary. An air purification system is usually fixed on a shelf or a desk when it is small and is usually positioned along a wall when it is big. When such a stationary air purification system is used, only air within a limited range is purified. Even if convection is used, it takes a large amount of time to purify the entire amount of indoor air using convection. Moreover, when space is not open but is partitioned, convection is not efficiently performed. As a result, only air within a limited range around the air purification system is purified.

Therefore, a method and system for purifying air in a wide range within a short period of time is desired.

SUMMARY OF THE INVENTION

The present invention provides a method and system for purifying air while moving.

The present invention also provides a method and system for purifying air even in a space where convection is not performed efficiently.

Additional aspects and/or advantages of the invention will be set forth in part in the description which follows and, in part, will be apparent from the description, or may be learned by practice of the invention.

According to an aspect of the present invention, there is provided a system for purifying air, including an air purification unit inhaling and purifying the air, a moving unit moving the system, and an object sensing unit sensing a wall existing to the side of the system in a direction in which the moving unit moves, wherein the moving unit moves while keeping a distance within a predetermined range from the wall sensed by the object sensing unit.

According to another aspect of the present invention, there is provided a method of purifying air while moving, including sensing a wall using an air purification system, approaching in a direction in which the wall is sensed, and moving along the wall while keeping a distance within a predetermined range from the wall.

According to still another aspect of the present invention, there is provided a method of purifying air while moving, including obtaining features of a contaminant in air around an air purification system, setting a moving direction according to the features of the contaminant, and moving in the moving direction.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE PREFERRED EMBODIMENTS

Figure 1A:
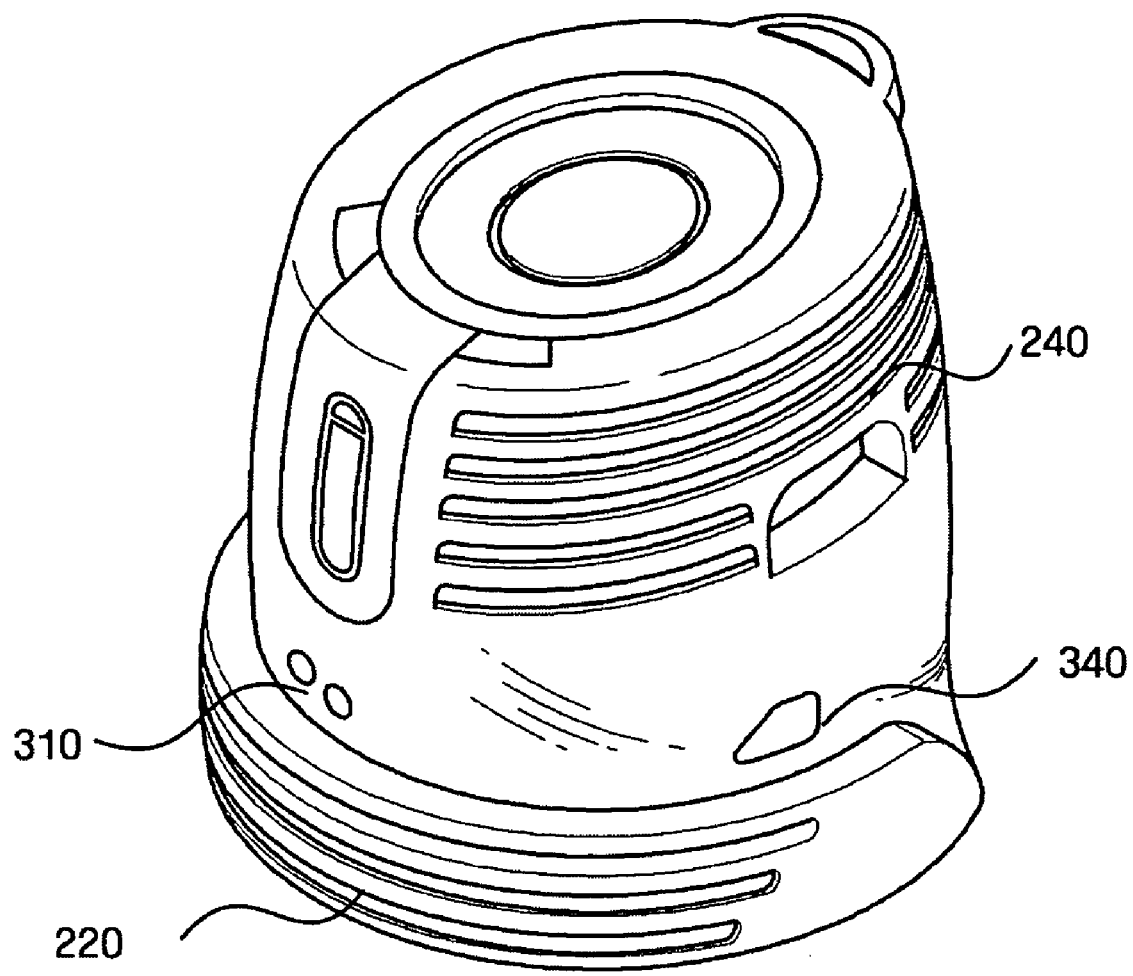
FIG. 1A is a perspective view of an air purification system according to an embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

The term "air purification system" indicates a system for purifying air, which provides an air cleaning or purifying function. For example, the air purification system removes contaminating particles and gases from the air, thereby providing clean air.

A conventional stationary air purification system cannot efficiently purify the air in wide spaces or places where convection is not performed efficiently. However, when an air purification system moves to a contaminated position and purifies the air, contaminated air may not be able to flow freely to the air purification system. In addition, when an air purification system moves to a partitioned space and purifies the air, a purification effect can be increased. Meanwhile, anions do not remain in the air long after being generated by an air purification system, and therefore, it is difficult to influence the effect of anions in a large space.

Figure 1B:
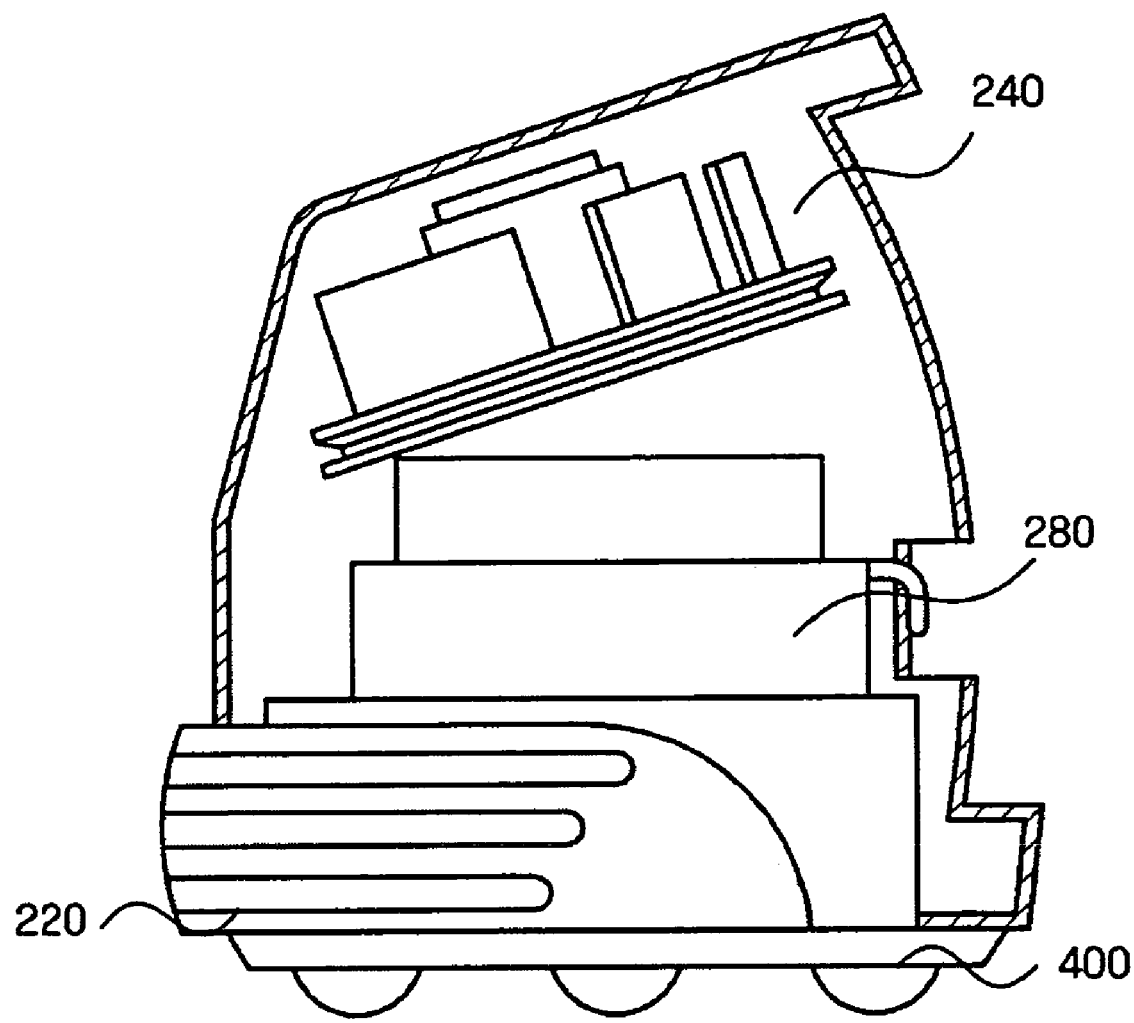
FIG. 1B is an internal view of the air purification system shown in FIG. 1A.

FIG. 1A is a perspective view of an air purification system according to an embodiment of the present invention, and FIG. 1B is an internal view of the air purification system.

The air purification system includes a moving unit 400 moving the air purification system, an object sensing unit enabling the moving unit 400 to avoid collision with an obstacle and move within a predetermined distance of the wall, an air purification unit purifying the air, and an air sensing unit sensing the degree of contamination and odor in the air. Although not shown, the air purification system also includes a control unit controlling movement and functions according to information generated by elements of the air purification system. Besides this, a charger, a portable power supply unit, a display unit, and an input unit are additionally included in the air purification system.

In detail, the moving unit 400 moves the air purification system. The moving unit 400 includes a driver generating a dynamic force and a traveler that moves the air purification system using the dynamic force. In addition, the moving unit 400 includes a moving distance calculator calculating a distance that is moved. The moving unit 400 may be coupled with a body of the air purification system to be positioned at the bottom of the air purification system.

The object sensing unit senses a wall using a wall sensor 340 to keep the air purification system separated from the wall by at least a predetermined distance and senses an obstacle using an obstacle sensor 310 to prevent the air purification system from colliding with an obstacle while the air purification system is moving. In addition, when the air purification system contacts an obstacle while moving, the object sensing unit senses contact with an object using a collision sensor so that the moving unit 400 can turn round the object or move in an opposite direction. Besides this, the air purification system may selectively include a fall sensor to enable the air purification system to avoid being dented while moving.

The air purification unit includes an inhaler 220, a discharger 240, and a contaminant remover 280. The inhaler 220 identifies dust, noxious gas, stinky gas, or the like in air and on an indoor floor and inhales air. To identify them, the inhaler 220 uses information sensed by the air sensing unit. The contaminant remover 280 filters out contaminants inhaled by the inhaler 220. The discharger 240 discharges air from which the contaminants have been removed.

The air sensing unit includes a dust sensor, an odor sensor, and a volatile organic compound (VOC) sensor. The dust sensor senses the amount of dust in air and determines the degree of contamination. The VOC sensor and the odor sensor can respectively measure and check the concentration of chemical substances and odor components.

To move the moving unit 400, information on a direction in which the moving unit 400 is to move and a distance by which the moving unit 400 is to move, i.e., information on a moving direction and a moving distance, is needed. This information can be obtained using the object sensing unit and the air sensing unit. Position information of an obstacle and a wall collected by the object sensing unit is sent to the control unit, which transmits to the moving unit 400 a command instructing a traveler to move a moving distance thereof. In addition, when contamination information is collected via the air sensing unit, the control unit may sort spaces according to the degree of contamination and transmit to the moving unit 400 a command instructing it to move to a region having a high contamination degree. The control unit collects information obtained by elements performing their functions and operates other elements based on the information.

Hereinafter, the individual elements of the air purification system and their operating mechanisms will be described in detail with reference to the attached drawings.

Figure 2:
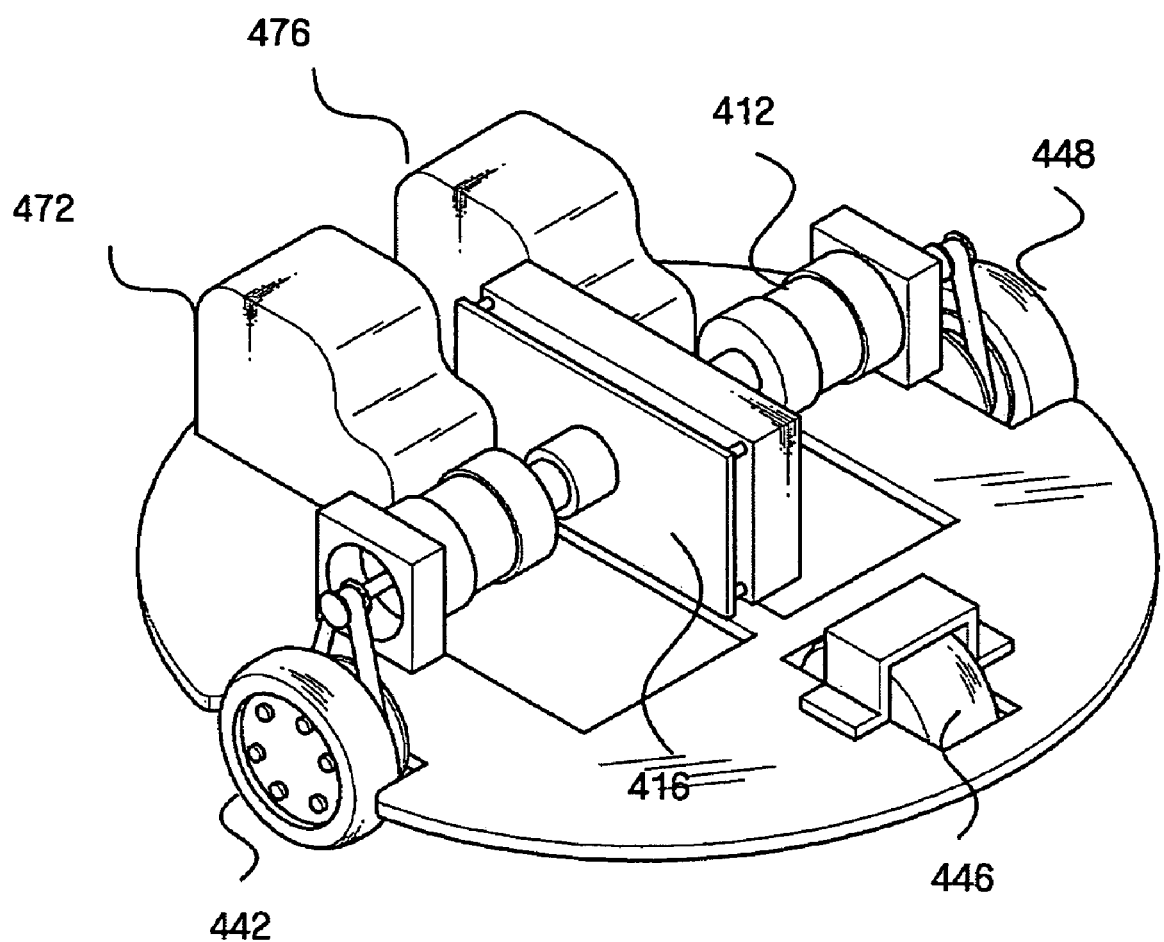
FIG. 2 illustrates a moving unit of the air purification system shown in FIGS. 1A and 1B.

FIG. 2 illustrates the moving unit 400 of the air purification system shown in FIGS. 1A and 1B.

As described with reference to FIGS. 1A and 1B, the moving unit 400 includes the driver, the traveler, and the moving distance calculator.

The traveler moves the moving unit 400 and the body of the air purification system, which is connected to the moving unit 400. The traveler may be implemented using wheels 442, 446, and 448 or using four legs as used for movement in recent robots.

The driver transmits a dynamic force to the traveler and controls the direction of the traveler. The driver includes a steering section 412 and a dynamic force transmitter 416. The dynamic force transmitter 416 includes a motor generating a dynamic force from an energy source like electric power. The steering section 412 controls the direction of the traveling unit. Direction control is possible by controlling at least one of the wheels 442, 446, and 448 of the traveling unit. Although not shown in FIG. 2, the direction control can be accomplished by turning the wheel 446 positioned in a moving direction to the left or right.

The moving distance calculator including portions 472 and 476 calculates a distance that the traveling unit has moved. For example, the moving distance calculator counts the number of rotations of each of the left and right wheels 442 and 448 of the traveler and multiplies the number of rotations by the diameter of each wheel 442 or 448, thereby calculating the moving distance of the wheel 442 or 448.

An air purification system according to an embodiment of the present invention provides three modes of air purification. The air purification system of the present invention is mobile and thus needs to be charged. The air purification system is in a stationary mode similar to the mode of a conventional air purification system while being charged or while in a fixed state. When the air purification system is fully charged, it can move free from a fixed power supply unit. The air purification system can move along a wall or trace a contaminant in an automatic moving mode or can be moved and operated by a person in a manual moving mode. In the manual moving mode, a user can manually move the air purification system to a desired place or a place where the user usually stays. The conventional air purification system is not free from the fixed power supply unit and thus can move only by a length of a power cord. Since the length of the power cord is limited, it may be inconvenient to move the air purification system from one place to another. However, the air purification system according to the embodiment of the present invention is free from the fixed power supply unit and can be manually moved by a user, thus allowing the user to purify the air in a desired place free from the limitations of a power cord.

Figure 3:
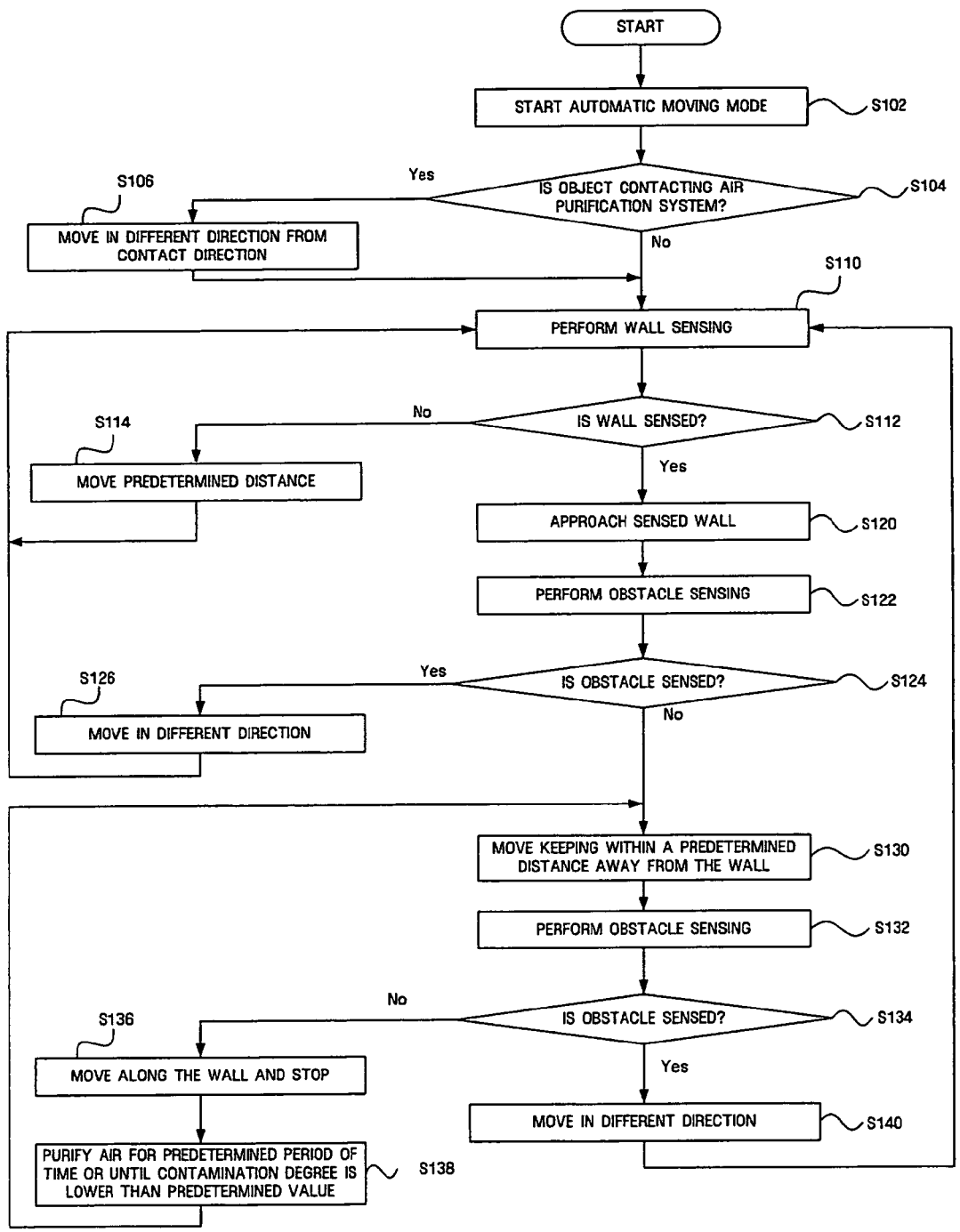
FIG. 3 is a flowchart of a procedure for moving along a wall according to an embodiment of the present invention.

FIG. 3 is a flowchart of a procedure for moving along a wall according to an embodiment of the present invention.

In operation S102, an automatic moving mode is manually selected by a user or automatically starts when the power of an air purification system is turned on. The mode selection can be performed using a button or a remote control unit or according to a schedule stored in the air purification system. The air purification system may be in contact with an object or connected with a charging station in a charging mode before the automatic moving mode starts. Accordingly, in operation S104 it is determined whether the air purification system is in contact with an object. If it is determined that the air purification system is in contact with an object, the air purification system moves in a direction different from the contact direction in operation S106. When the air purification system is connected with the charging station, contact may also be determined and the air purification system may move in an opposite direction to the charging station.

In operation S110, wall sensing is performed. To sense a wall, the air purification system may turn round at a predetermined angle or move to the front, back, left or right by a predetermined distance. The rotation direction may be different according to embodiments. When the wall is sensed and is close to the air purification system, the air purification system moves along the wall immediately without turning again.

When the wall is not sensed in operation S112, the air purification system moves in a predetermined direction in operation S114. Next, wall sensing is performed again. In operation S114, the air purification system may move by a predetermined distance, e.g., 20 or 50 cm or may move continuously in one direction until the wall is sensed. Although not shown, there may be many ways of sensing the wall. When the wall is not sensed, the wall may be found by continuously moving ahead. Since a wall positively exists in a closed space, the air purification system will surely encounter a wall when moving in one direction.

When the wall is sensed, the air purification system approaches in a direction where the wall is sensed in operation S120. To sense the wall, a wall sensor may be used. Since an obstacle may exist on a path approaching the wall, obstacle sensing is performed in operation S122. In particular, when there are many pieces of furniture and many electronic products in a room, the air purification system is highly likely to collide with an obstacle while moving. Accordingly, to avoid collision with an obstacle, the obstacle sensing is performed.

When an obstacle is sensed in operation S124, the air purification system moves in a direction different from the obstacle direction in operation S126. Next, the air purification system may perform the wall sensing again in operation S110 while moving along the wall. The air purification system uses the wall sensor to stay within a predetermined distance from the wall and uses an obstacle sensor to avoid obstacles. When approaching the wall, the air purification system recognizes that the wall is close via an object sensing unit.

Then, the air purification system moves along the wall while keeping within the predetermined distance from the wall in operation S130. The predetermined distance from the wall is far enough away from the wall to allow the air purification system to easily turn when meeting an obstacle. However, when the air purification system is too far away from the wall, it is difficult to move along the wall. Accordingly, the predetermined distance from the wall should not be too far.

In operation S132, the air purification system continuously performs the obstacle sensing while moving. When an obstacle is sensed in operation S134, the air purification system moves in a different direction from the direction of the obstacle to avoid it in operation S140. Thereafter, the wall sensing is performed again in operation S110 since a relative position of the wall may change due to the movement of the system in operation S140. Here, the relative position of the wall and the distance and direction of the moving performed in operation S140 may be calculated to enable continued movement towards the wall.

To avoid an obstacle, the air purification system may move backwards. In another embodiment, when the air purification system senses an obstacle while moving along the wall counterclockwise, it may move, for example, to the left, by a predetermined distance to avoid the obstacle and then move toward the wall. The direction the air purification system moves to avoid an obstacle e.g., left or backwards, may be different according to circumstances.

When no obstacle is sensed in operation S134, the air purification system moves along the wall a predetermined distance and then stops in operation S136. Thereafter, in operation S138 the air purification system purifies air for a predetermined period of time or until a contamination degree is lower than a predetermined value.

The predetermined distance in operation S136 may be different according to an available air purification area of the air purification system and the contamination degree of the air to be purified. When the available air purification area is about 1 m^2, the air purification system moves a straight distance of at least 1 m and then performs air purification. The amount of time needed to purify the air may be different according to circumstances. Air purification may be performed while moving or may be performed during a pause in the course of moving along the wall. Since a large amount of power may be consumed when the air purification is performed while moving, the air purification may be performed at a low level while moving or may not be performed while moving but instead be performed after reaching a particular region, according to a state of a power supply and a contamination degree.

While moving toward the sensed wall, the air purification system performs the obstacle sensing, moves in a different direction when the obstacle is sensed in operation S126 or S140, and then performs the wall sensing again. Alternatively, the air purification system may move toward or along the wall without performing the wall sensing. Here, a control unit included in the air purification system calculates and stores the position of a target wall and calculates the direction and distance of moving performed to avoid the obstacle so that the air purification system can calculate the new position of the target wall relative to the new position of the air purification system and move to the wall.

Although not shown, the air purification system may collide with an object that the object sensing unit could not sense. For example, when the height of the object is too low, the obstacle sensor may not sense the object. In this case, collision may occur. Here, the air purification system may sense the collision using a collision sensor. Then, the air purification system moves in a direction different from the direction in which the collision occurred, so that it may sense the wall.

Figure 4:
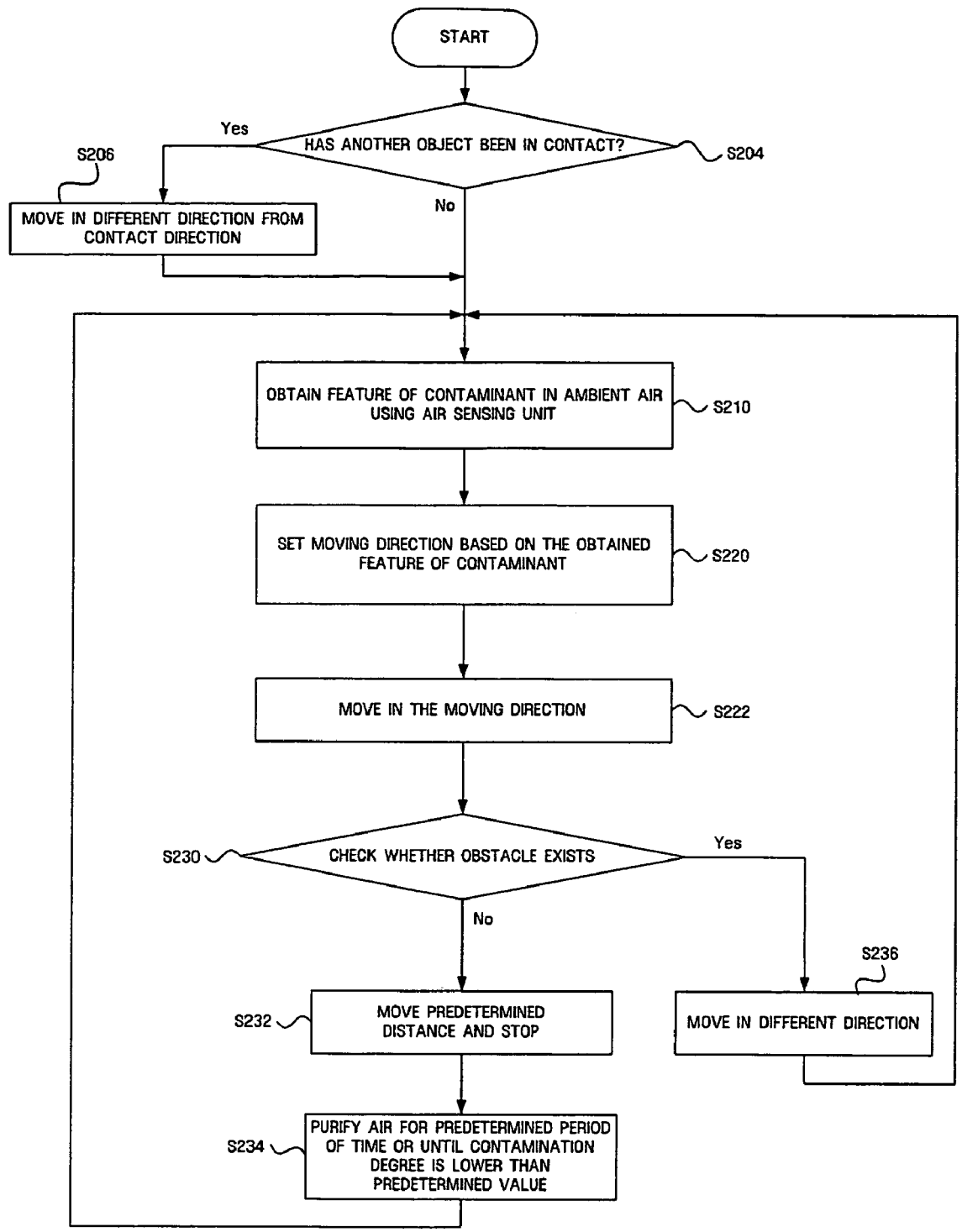
FIG. 4 is a flowchart of a procedure for detecting contamination, moving, and purifying air according to an embodiment of the present invention.

FIG. 4 is a flowchart of a procedure for detecting contamination, moving, and purifying air according to an embodiment of the present invention.

An air purification system is moved to purify air in a wide area. Another reason to move the air purification system is that it is necessary to purify air in a region having a high contamination degree in order to increase the efficiency of purification. Referring to FIG. 4, the air purification system detects contamination and moves while avoiding an obstacle to purify air.

The air purification system may have been in contact with another object or connected with a charging station in a charging mode before the automatic moving mode starts. Accordingly, in operation S204 it is determined whether the air purification system is in contact with another object. If it is determined that the air purification system is in contact with another object, the air purification system moves in a direction different from the contact direction in operation S206. When the air purification system is connected with the charging station, contact may also be determined and the air purification system may move in an opposite direction to the direction of the charging station.

In operation S210, the air purification system may obtain a feature of a contaminant in ambient air using an air sensing unit. Here, a concentration difference in the contaminant may be obtained. The concentration difference may be determined based on the distribution of a particular substance. The distribution of components of the contaminant may be converted into an arithmetic value by weighting chemical substances, dust, or the like so that it can be determined if there is a great or small amount of the contaminant. The feature of the contaminant may be the amount of dust in the air within a predetermined space, the amount of particles causing an odor, or the amount of a VOC. When the air sensing unit is installed on the outside of the air purification system, the feature of a contaminant can be obtained from every side.

To detect a direction in which there is a large amount of a contaminant or in which a contamination degree is high, the air purification system may move a predetermined distance to the front, back, left, and right. After the feature of the contaminant is obtained, the air purification system sets a target moving direction in operation S220. Here, the air purification system may move to a region having a large amount of contaminant, e.g., a region having a large amount of dust or VOC. When the distribution of the contaminant gradually increases in a particular direction, the air purification system may purify air moving from a region having a small amount of contaminant to a region having a large amount of contaminant. The target moving direction may be differently set according to the feature and distribution of the contaminant. The method of obtaining of the feature of a contaminant will be described in detail with reference to FIG. 5 later.

In operation S222, the air purification system moves in the target moving direction. While moving, the air purification system checks whether an obstacle exists in operation S230. When an obstacle is sensed, the air purification system moves in a direction different from the target moving direction in operation S236. Here, the air purification system may move to the back, left, or right. In addition, the air purification system may move while changing a moving angle little by little so that it avoids the obstacle but still travels in a direction that is similar to the target moving direction.

When the moving direction is changed, it may be difficult to again move in the target moving direction. Accordingly, operations S210 through S220 of obtaining the feature of a contaminant using the air sensing unit and setting a target moving direction may be repeated. Meanwhile, the air purification system may move in the target moving direction by calculating the target moving direction and the direction and distance that the air purification system moved after the obstacle was sensed.

When an obstacle does not exist, the air purification system moves a predetermined distance along a wall and then stops in operation S232. Thereafter, the air purification system purifies air for a predetermined period of time or until a contamination degree is lower than a predetermined value in operation S234.

The predetermined distance in operation S232 may be different according to an available air purification area of the air purification system and the contamination degree of the air to be purified. When the available air purification area is about 1 m^2, the air purification system moves a straight distance of at least 1 m and then performs air purification. The amount of time needed to purify the air may be different according to circumstances. Air purification may be performed while moving or may be performed during a pause in the course of moving along the wall. Since a large amount of power may be consumed when the air purification is performed while moving, the air purification may be performed at a low level while moving or may not be performed while moving but instead be performed after reaching a particular region, according to a state of power supply and a contamination degree.

In operation S236, the air purification system moves in a different direction to the target direction if an obstacle is sensed in its path while moving and subsequently operation S210 is performed to obtain the feature of a contaminant. In another embodiment, the air purification system may move without obtaining the feature of a contaminant. Here, a control unit included in the air purification system stores a target position and calculates the direction and distance that the air purification system moved to avoid the obstacle so that the air purification system can calculate the target position and move thereto.

Although not shown, the air purification system may collide with an object that the object sensing unit could not sense. For example, when the height of the object is too low, the obstacle sensor may not sense the object. In this case, collision may occur. Here, the air purification system may sense the collision using a collision sensor. Then, the air purification system moves in a direction different from the direction in which the collision occurred to sense the wall.

Instead of moving along a wall or tracing a contaminant, the air purification system may move to the center of a space and then purify air. The air purification system can determine that it is located at the center of the space when distances to objects sensed in every direction using an object sensor are similar to each other. Alternatively, after moving in a straight line from one wall to another wall, if the air purification system moves backwards half the distance as the straight distance between walls, it may be located at the center of the space.

Figure 5:
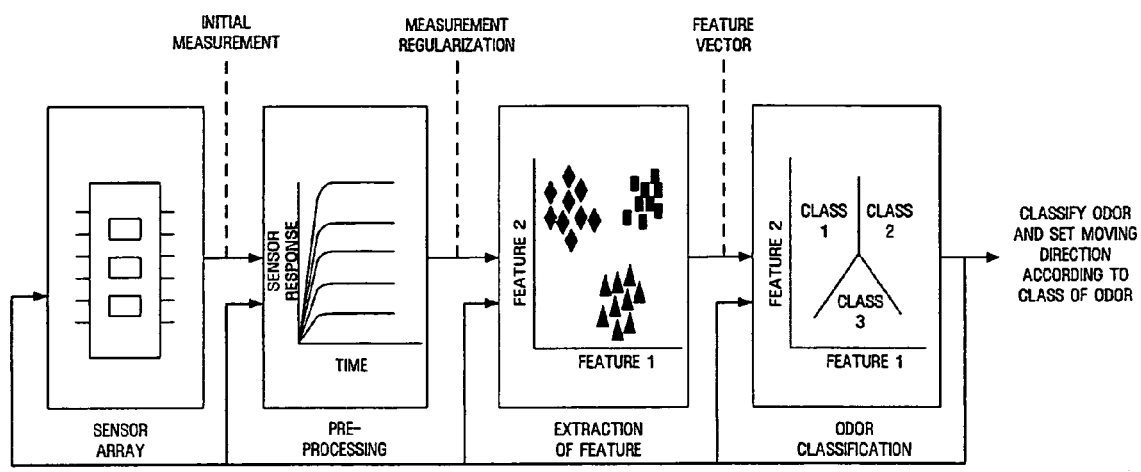
FIG. 5 illustrates a procedure for sensing and classifying odors according to an embodiment of the present invention.

FIG. 5 illustrates a procedure for sensing and classifying odors according to an embodiment of the present invention. Odors are sensed using a plurality of sensors and are classified by patterning sensing results acquired by the sensors. Based on the result of classification, a moving direction can be set to a direction having a strong odor or a large amount of contaminant.

Referring to FIG. 5, a sensor array is a set of a plurality of sensors included in a sensing unit. To measure odors in many directions, sensor arrays may be installed on the front, back, left, and right sides of an air purification system. Values measured by the sensor arrays are pre-processed. Contaminants or substances causing odors are accumulated with time. Based on the accumulated information, the feature of each contaminant or substance, e.g., whether there is a large amount of ammonia or formaldehyde, is detected. The detected features are classified. The moving direction is set based on a result of classifying odors caused by substances obtained through particular sensors. With such operations, the air purification system identifies the odors and moves in the moving direction. Here, information calculated in each stage may be fed back to a previous stage to be used to detect contaminants or substances causing odors. The moving direction may be calculated by a control unit. The control unit transmits the calculated information to a moving unit, which moves in a particular direction according to the calculated information.

Figure 6:
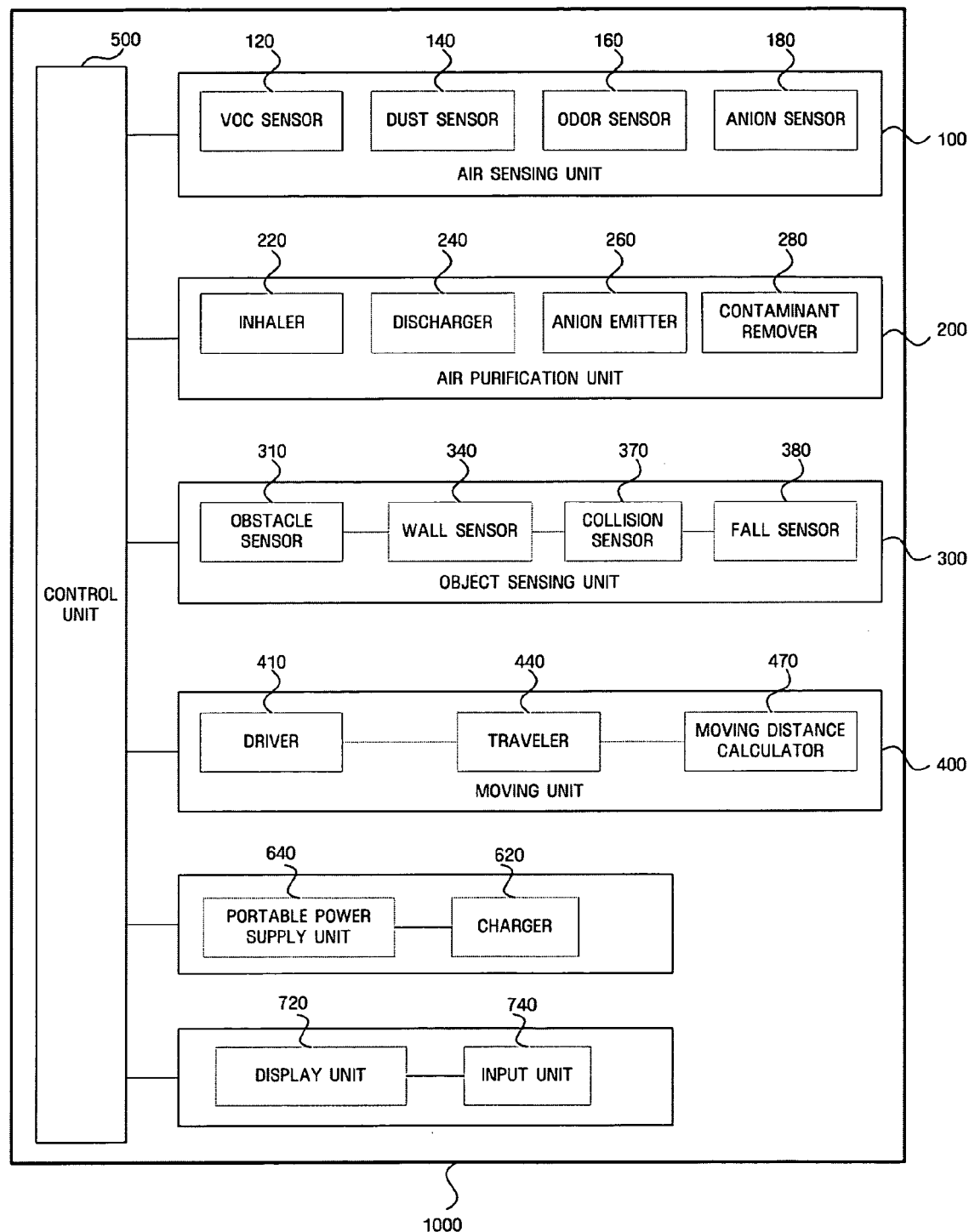
FIG. 6 is a block diagram of an air purification system according to an embodiment of the present invention.

FIG. 6 is a block diagram of an air purification system 1000 according to an embodiment of the present invention.

The air purification system 1000 includes an air sensing unit 100, an air purification unit 200, an object sensing unit 300, a moving unit 400, and a control unit 500 requesting elements of the air purification system 1000 to perform functions based on information calculated by other elements. The air sensing unit 100 senses substance in the air and calculates a contamination degree in a current region. When moving to a region having a high contamination degree, the air sensing unit 100 distinguishes between the region having the high contamination degree and a region having a low contamination degree. The air sensing unit 100 may include different types of sensors, i.e., a VOC sensor 120 sensing a VOC, a dust sensor 140 sensing the amount of dust, an odor sensor 160 sensing an odor such as a smell of ammonia gas, and an anion sensor 180 sensing whether there is a large or small amount of anions.

The VOC sensor 120 collects compounds in the air and applies a particular electrical, chemical, or physical stimulation to them to detect the amount of a VOC. Dust indicates minute particles floating in the air. The dust sensor 140 emits light and senses the amount of dust based on the degree to which the light is scattered by the dust. Alternatively, the dust sensor 140 inhales a predetermined amount of air and measures the amount of dust in the air. The odor sensor 160 measures the amount of ammonia gas or formaldehyde, for example, causing an odor in the air and determines whether the odor is strong.

The air purification unit 200 purifies air. The air purification unit 200 inhales and purifies air and discharges the purified air. In addition, the air purification unit 200 may emit anions to remove contaminants. Air purification includes dust collection which involves inhaling dust and discharging clean air, deodorization which involves removing an odor, sterilization which involves eliminating harmful bacteria, and restoration which involves restoring and adjusting an unbalanced atmosphere. The air purification unit 200 includes an inhaler 220 inhaling air, a contaminant remover 280 removing contaminants from the inhaled air, and a discharger 240 discharging the air from which the contaminants have been removed. The air purification unit 200 also includes an anion emitter 260 emitting anions so that the anions combine with colloids floating in the air, thereby purifying the air.

The inhaler 220 may be disposed on the bottom or front of the air purification unit 200. Alternatively, a plurality of inhalers 220 may be disposed on the bottom and sides or the top and sides of the air purification unit 200. Although the inhaler 220 may be disposed at various positions, the position of the inhaler 220 may be determined by taking into account its physical position in relation to the discharger 240 since the inhaled air is discharged through the discharger 240 after being purified. For example, when inhalers 220 are disposed on the bottom and front, the discharger 240 may be disposed on the back or top, or vice versa. However, to reduce air resistance when the air purification system 1000 purifies air while moving, the inhaler 220 may be disposed on a side of the air purification system 1000 that faces a direction in which the air purification system 1000 usually moves and the discharger 240 may be disposed on an opposite side. In this case, since the air resistance is reduced, energy consumption that occurs while moving can also be reduced.

The contaminant remover 280 removes contaminants from inhaled air. In this case, dust may be stored within the air purification system 1000 and contaminants may be removed using anions or high-voltage electricity. Meanwhile, since air purification includes sterilization in addition to dust collection, the contaminant remover 280 includes a function that sterilizes bacteria in the inhaled air.

The contaminant remover 280 removes contaminants using a filtering or mechanical method, an electrical method, or a combination thereof. The filtering or mechanical method performs dust collection and deodorization using filter media or active carbon. The electrical method collects dust using a positive electrode and eliminates contaminants. The combination method eliminates contaminants using the two types of methods.

The anion emitter 260, as described above, emits anions in the air so that the anions combine with harmful substances existing in a colloid state. As a result, the anion emitter 260 purifies air and performs various actions that benefit the human body.

The object sensing unit 300 enables the air purification system 1000 to avoid obstacles and move along a wall. The object sensing unit 300 includes an obstacle sensor 310, a wall sensor 340, and a collision sensor 370. The obstacle sensor 310 detects existence of an obstacle in a moving direction. The obstacle sensor 310 may sense an object in the moving direction using a sensor such as an ultrasonic sensor or infrared sensor which senses a distance. Accordingly, the obstacle sensor 310 may be disposed on a side of the air purification system 1000 that faces a direction in which the air purification system 1000 usually moves. Meanwhile, the wall sensor 340 senses a wall to enable the air purification system 1000 to move while keeping within a predetermined distance from the wall. Accordingly, the wall sensor 340 may be disposed on a side of the air purification system 1000.

The collision sensor 370 informs the air purification system 1000 of a collision when the air purification system 1000 collides with an obstacle that is not sensed while moving. The collision sensor 370 may be implemented as an on/off switch disposed on the outside of the air purification system 1000. That is, in any event of collision, the on/off switch can sense the collision by being pressed down. A fall sensor 380 may be additionally provided. The fall sensor 380 senses a dip or a steep slope in the floor and prevents the air purification system 1000 from advancing. The fall sensor 380 can sense a dip by checking whether a signal sent in an advancing direction is received back uniformly.

The moving unit 400 moves the air purification system 1000 and calculates a moving distance. The moving unit 400 includes a driver 410, a traveler 440, and a moving distance calculator 470. The driver 410 includes a dynamic force transmitter such as a motor, which generates a dynamic force from electric power and converts it to kinetic energy. The driver 410 also includes a steering section to set a moving direction. The traveler 440 may be implemented using a wheel or a caterpillar. The direction of the traveler 440 can be changed using the steering section included in the driver 410 or can be changed by setting the rotation speeds of opposite wheels to be different. Alternatively, since slow movement rather than fast movement is required taking into account the characteristics of the air purification system 1000, traveling means other than wheels may be used. The moving distance calculator 470 calculates a distance that the air purification system 1000 has moved. When the traveler 440 includes wheels at opposite sides of the air purification system 1000, the distance can be obtained using the number of rotations of each wheel and the diameter thereof.

The control unit 500 controls each of the elements included in the air purification system 1000 based on information generated by each element. For example, to avoid an obstacle while moving, the control unit 500 continuously receives information from the object sensing unit 300. When the object sensing unit 300 senses a wall, the control unit 500 receives the position and direction of the wall from the object sensing unit 300. Then, the control unit 500 commands the moving unit 400 to move in the direction of the wall. In addition, the control unit 500 may check whether the air purification system 1000 has moved a predetermined distance using the moving distance calculator 470 and command the moving unit 400 to stop. Conversely, the control unit 500 may transmit distance information to the moving unit 400 and then the moving distance calculator 470 may continuously calculate a moving distance and command the driver 410 and the traveler 440 to stop. To search for a contamination source, the control unit 500 may command the moving unit 400 to move in a direction obtained from the air sensing unit 100.

While the air purification unit 200 is purifying air, the air sensing unit 100 continuously senses a contamination degree of the air and reports the contamination degree to the control unit 500. Then, the control unit 500 stops the air purification function of the air purification unit 200 when the contamination degree is lower than a predetermined level and commands the moving unit 400 to move.

In addition to the elements described with reference to FIG. 6, a charger 620 may be further provided to enable the air purification system 1000 to be free from a power supply while moving. The charger 620 charges the air purification system 1000 with electricity so that the air purification system 1000 can store electric energy. The charger 620 includes a charging station. In addition, a portable power supply unit 640 may be included in the air purification system 1000. The portable power supply unit 640 such as a battery is charged and then discharged, thereby providing electric energy.

Meanwhile, the air purification system 1000 may include a display unit 720 to allow a user to know the current function or state of the air purification system 1000 and an input unit 740 allowing the user to input a command controlling a function of the air purification system 1000. The input unit 740 may be implemented as a button or a touch screen installed in the display unit 720 and may be controlled using a remote control unit.

Figure 7:
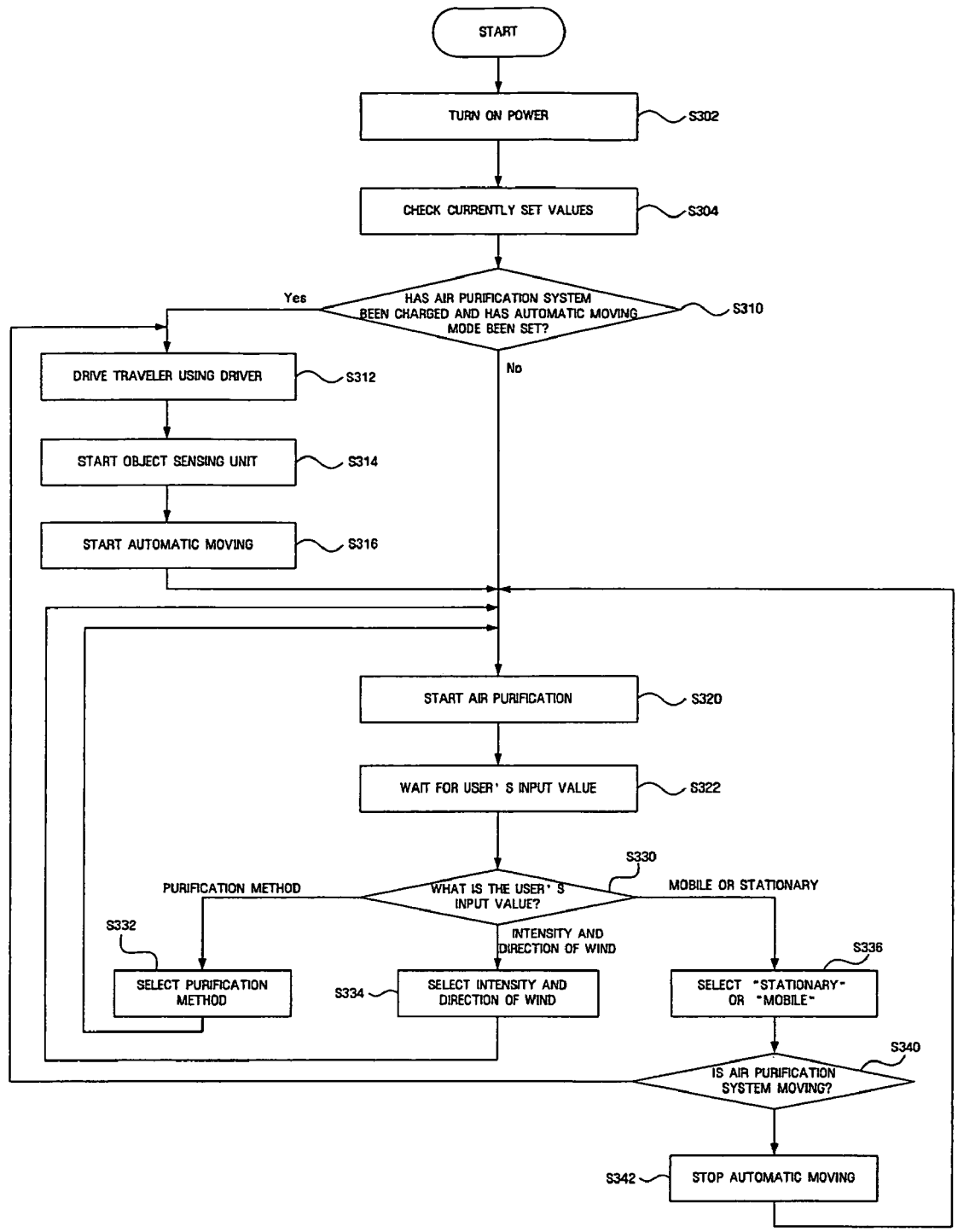
FIG. 7 is a flowchart of a procedure for purifying air according to an embodiment of the present invention.

FIG. 7 is a flowchart of a procedure for purifying air according to an embodiment of the present invention.

In operation S302, a user turns on the power of an air purification system. In operation S304, the air purification system checks current settings. Here, the air purification system checks whether automatic moving mode is activated, what purification method has been used, whether enough power is available to purify air, etc. If it is determined that enough power is available and a current setting indicates the automatic moving mode is activated in operation S310, a driver drives a traveler in operation S312. In operation S314, an object sensing unit starts to perform object sensing. As described above, the object sensing unit senses a wall, an obstacle, and a collision. In operation S316, the air purification system starts moving in automatic moving mode. In operation S320, the air purification system starts to purify air. Meanwhile, if it is determined that a stationary mode has been set, the air purification system starts air purification without operations S312 through S316. According to the user's setup, air purification may not be performed while moving but may only be performed when the air purification system reaches a particular place. To allow the user to input a command to start or stop a function during the air purification, the air purification system waits for the user's input while performing functions in operation S322. If the user makes an input in operation S330, a function may be stopped or another function may be started.

In detail, three types of inputs may be made to change a function state: an input to change a purification method, an input to change a moving mode, and an input to change the intensity and direction of the wind.

In operation S332, the user can select or change the purification method. Various purification methods may be provided. An automatic operation method, a sandy dust removal method, a power save function, or a deodorization function may be selected. In operation S334, the user can select the intensity and direction of the wind. Here, the intensity of the wind may be adjusted to "turbo", "strong", "weak", and "breeze". In operation S336, the user can set the moving mode to "stationary" or "mobile". When it is determined that the air purification system purifies air in the stationary mode in operation S340, the method goes to operation S312 to start moving. When it is determined that the air purification system is moving in operation S340, the automatic moving mode stops and the air purification system is made stationary in operation S342 and performs air purification.

Figure 8:
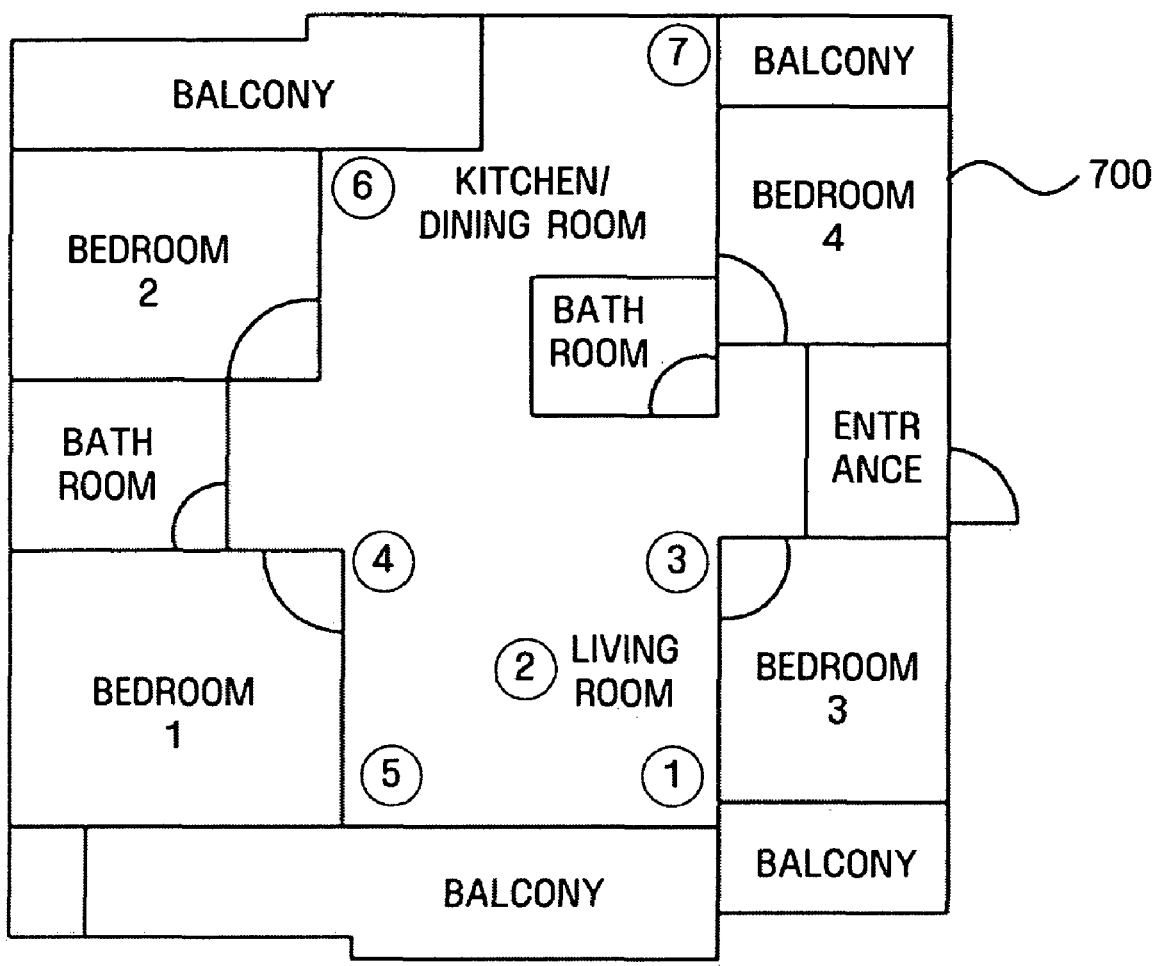
FIG. 8 is an indoor layout for explaining a purification effect of a conventional stationary air purification method.

FIG. 8 is an indoor layout for explaining a purification effect of a conventional stationary air purification method.

In an experiment, one conventional stationary air purification system is used to purify air in the indoor layout show in FIG. 8. Table 1 shows dust removal rates when the amount of dust in the air was measured at position 1 within an apartment 700 and air purification was performed at each position for 30 minutes.

TABLE 1

| Measurement position | Position of air purification system | Dust removing rate (%) | |
|---|---|---|---|
| | | 0.3 microns | 0.5 microns |
| 1 | 1 | 29.5 | 74.3 |
| 1 | 2 | 26.9 | 69.1 |
| 1 | 3 | 24.3 | 67.2 |
| 1 | 4 | 19.9 | 58.9 |
| 1 | 6 | 12.3 | 53.2 |
| 1 | 7 | 5.7 | 29.3 |
| 1 | Natural cleaning | 3.3 | 24.2 |

Here, the removal rate of particles having a size of 0.3 microns and the removal rate of particles having a size of 0.5 microns are expressed as percentages. Accordingly, when more dust was removed, the number is greater. As is seen from Table 1, the dust removal rate differs greatly according to a distance between the measurement position and the position of the air purification system. In particular, the dust removal rates in positions 1 and 7 differ greatly.

As a result, it can be inferred that the air purification effect of the conventional stationary air purification system is different depending on where the air purification system is stationed. In particular, in a partitioned space including many pieces of furniture, the air does not flow efficiently, and therefore, a difference in the dust removal rate may increase according to where the air purification system is positioned.

Figure 9:
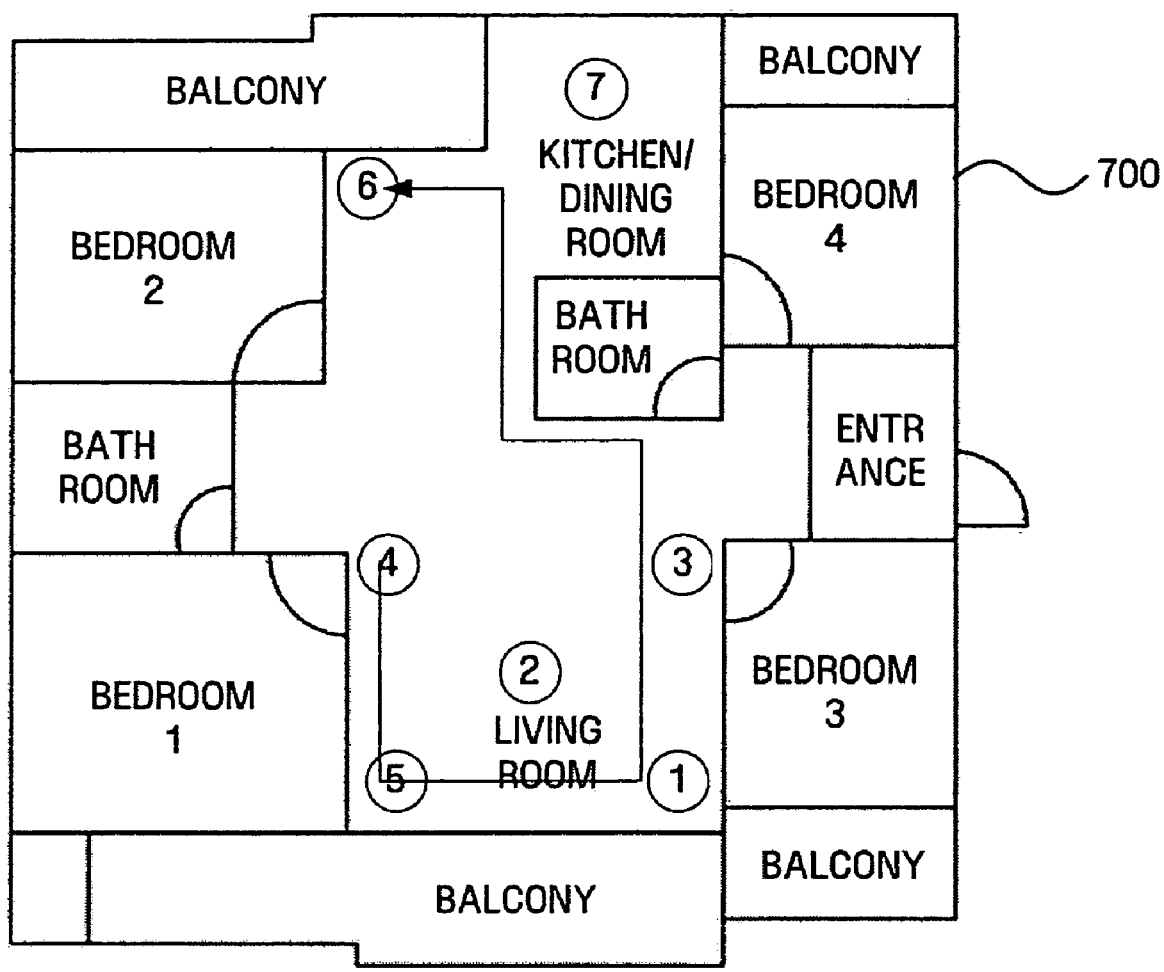
FIG. 9 is an indoor layout for explaining a purification effect of a mobile air purification method according to an embodiment of the present invention.

FIG. 9 is an indoor layout for explaining a purification effect of a mobile air purification method according to an embodiment of the present invention. In two experiments, the air was measured at position 1 and an air purification system according to an embodiment of the present invention purified air while moving. Table 2 shows dust removal rates measured in the two experiments and dust removal rates measured at positions 6 and 7 after the air purification system finished moving in the second experiment.

TABLE 2

| Measurement position | Experiment | Position of air purification system | Dust removing rate (%) | |
|---|---|---|---|---|
| | | | 0.3 microns | 0.5 microns |
| 1 | 1 | 4→5→1→3→7→6 | 27.3 | 67.5 |
| 1 | 2 | 4→5→1→3→7→6 | 24.4 | 67.7 |
| 6 | 2 | After purification | 40.2 | 77.2 |
| 7 | 2 | After purification | 36.6 | 74.7 |

As is seen from Table 2, the dust removal rates measured at position 1 are not very different from those shown in Table 1. In particular, even though position 6 is the last position the air purification system reaches and is far from position 1, the dust removal rate is high. Meanwhile, the dust removal rates at position 6 where moving was completed and position 7 closest to position 6 are 40.2 and 36.6%, respectively, with respect to particles having a size of 0.3 microns and 77.2 and 74.7%, respectively, with respect to particles having a size of 0.5 microns. Accordingly, it can be inferred that the dust removing rate of the air purification system according to the embodiment of the present invention is significantly higher than that of the conventional stationary air purification system described with reference to FIG. 8.

Figure 10:
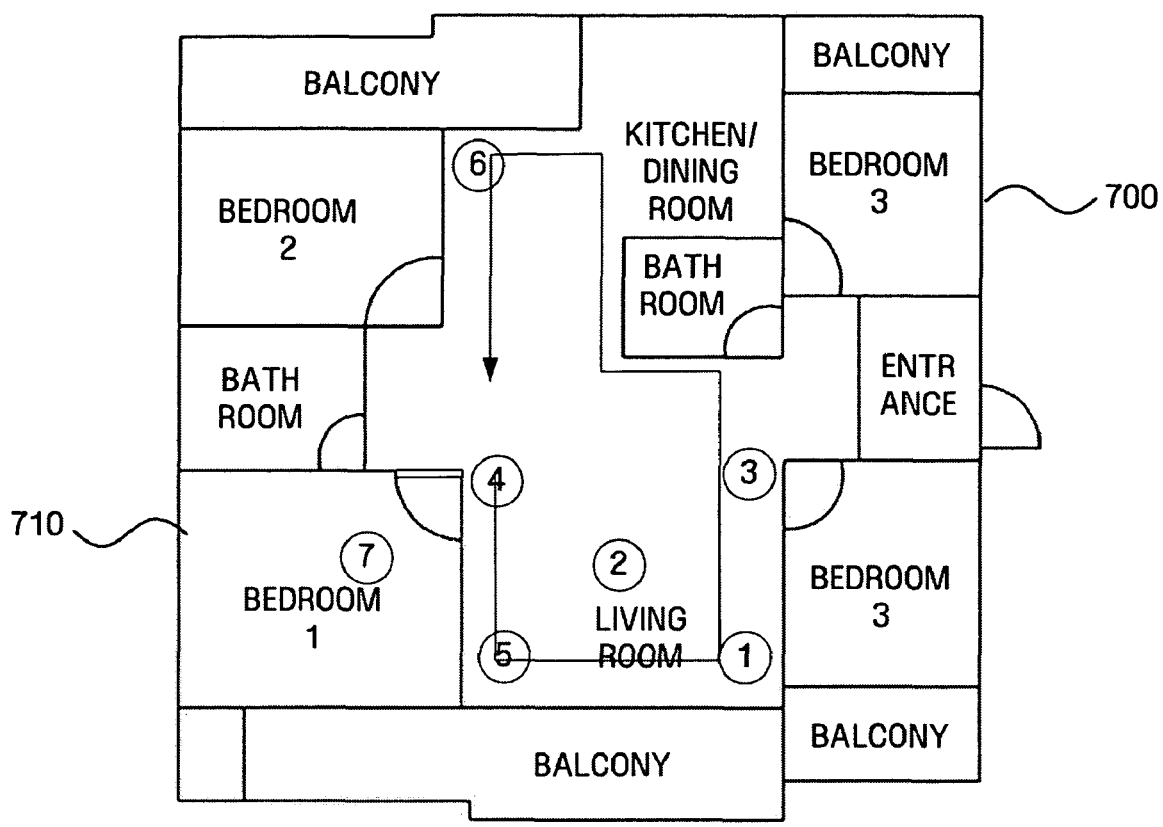
FIG. 10 is an indoor layout for explaining a purification effect of a mobile air purification method according to another embodiment of the present invention.

FIG. 10 is an indoor layout for explaining a purification effect of a mobile air purification method according to another embodiment of the present invention.

When the conventional stationary air purification system purifies air in a living room, a satisfactory air purification effect is not accomplished in a space like a bedroom1 730 that is separated from the living room. Contrarily, since a mobile air purification system according to an embodiment of the present invention moves along the wall of the living room, a much better air purification effect is accomplished in the bedroom if a door to the bedroom1 710 is open.

In an experiment, the air purification system moved through positions 4→5→1→3→6, as shown in FIG. 10, and the air was measured at position 7. For comparison, the air was also measured when a natural cleaning mode was performed and when the air purification system was stationed at position 1.

TABLE 3

| Measure-ment position | Air purification mode | Dust removing rate (%) | |
|---|---|---|---|
| | | 0.3 microns | 0.5 microns |
| 7 | Natural cleaning mode | 16.2 | 56.6 |
| 7 | Stationed at position 1 | 32.6 | 74.8 |
| 7 | Moving through 4→5→1→3→6 | 32.9 | 83.2 |

As is seen from Table 3, when the natural cleaning mode was performed, the dust removal rate was very low. With respect to particles having a size of 0.3 microns, a difference in a dust removal rates between when the air purification system was stationary and when the air purification system was moving is 0.3% and is not very significant. However, with respect to particles having a size of 0.5 microns, when the air purification system moved, a dust removal rate was 83.2% which is about 9% higher than a dust removal rate of 74.8% obtained when the air purification system was stationary.

As described above, the present invention provides an air purification system which can automatically move.

In addition, the present invention achieves effective air purification in space where convection is not performed efficiently.

It will be understood by those of ordinary skill in the art that various changes in form and details may be made therein without departing from the spirit and scope of the present invention as defined by the following claims. Therefore, it is to be appreciated that the above described exemplary embodiments embodiment is are for purposes of illustration only and not to be construed as a limitation of the invention. The scope of the invention is given by the appended claims, rather than the preceding description, and all variations and equivalents which fall within the range of the claims are intended to be embraced therein.

What is claimed is:

1. A system for purifying air, comprising:
an air purification unit to inhale and purify the air;
a moving unit to move the system;
an object sensing unit to sense an obstacle existing in a direction in which the moving unit moves; and
an air sensing unit to sense components existing in the air, wherein
the components include at least one of the amount of a volatile organic compound, the amount of dust, the amount of a substance causing an odor and the amount of anions,
the air sensing unit calculates an arithmetic value by weighting the amount of volatile organic compound, the amount of dust, the amount of substance causing an odor and the amount of anions, and
the moving unit determines a moving direction according to the arithmetic value calculated by the air sensing unit and the obstacle sensed by the object sensing unit.

2. The system of claim 1, wherein the moving unit comprises:
a driver to receive a dynamic force from a power supply and to adjust a moving direction;
a traveler to receive the dynamic force from the driver and move in the moving direction set by the driver; and
a moving distance calculator to calculate a distance that the moving unit has moved via the traveler.

3. The system of claim 1, wherein the object sensing unit comprises:
a wall sensor to sense a wall existing at a side of the system in the direction in which the moving unit moves.

4. The system of claim 1, wherein the object sensing unit comprises a collision sensor to sense a collision with an object, and
the moving unit moves in a direction different from a direction in which the collision occurred when the collision sensor senses the collision.

5. The system of claim 1, wherein the object sensing unit comprises a fall sensor to sense the evenness of a floor, and
the moving unit moves in a direction different from a direction in which declination is sensed by the fall sensor.

6. The system of claim 1, wherein the air purification unit comprises:
an inhaler to inhale the air;
a contaminant remover to remove contaminants from the inhaled air; and
a discharger to discharge the air from which the contaminants have been removed.

7. The system of claim 6, wherein the inhaler is disposed in the direction in which the moving unit moves, and
the discharger is disposed in a direction opposite to the direction in which the moving unit moves.

8. The system of claim 6, wherein the air purification unit further comprises an anion emitter to emit anions.

9. The system of claim 1, wherein the air sensing unit comprises:
a volatile organic compound (VOC) sensor to sense a VOC;
a dust sensor to sense the amount of dust in the air;
an odor sensor to sense the amount of a substance causing an odor; and
an anion sensor to sense the amount of anions existing in the air.

10. The system of claim 1, further comprising a charger to charge the system with electricity and a portable power supply unit.

11. The system of claim 1, further comprising a display unit to display a state of the system and an input unit allowing a user to select a function of the system.

* * * * *